United States Patent
Lin

(10) Patent No.: US 8,984,190 B2
(45) Date of Patent: Mar. 17, 2015

(54) METHODS AND DEVICES FOR BOOTING A NETWORK ATTACHED STORAGE WITH TWO LOGICAL UNITS

(71) Applicant: Western Digital Technologies, Inc., Irvine, CA (US)

(72) Inventor: James S. Lin, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/931,825

(22) Filed: Jun. 29, 2013

(65) Prior Publication Data

US 2014/0351463 A1    Nov. 27, 2014

Related U.S. Application Data

(60) Provisional application No. 61/826,919, filed on May 23, 2013.

(51) Int. Cl.
  *G06F 13/12*    (2006.01)
  *G06F 12/00*    (2006.01)
  *H04L 29/08*    (2006.01)

(52) U.S. Cl.
  CPC ............... *H04L 67/1097* (2013.01)
  USPC .............................. 710/74; 711/103

(58) Field of Classification Search
  CPC ... G06F 3/0689; G06F 3/0679; G06F 3/0685; H04L 67/1097
  See application file for complete search history.

(56) References Cited

U.S. PATENT DOCUMENTS

| | | | |
|---|---|---|---|
| 8,176,211 B2 | 5/2012 | Hashimoto | |
| 8,220,000 B2 | 7/2012 | Nagamatsu et al. | |
| 8,296,398 B2 | 10/2012 | Lacapra et al. | |
| 8,386,721 B2 | 2/2013 | Shimada et al. | |
| 2003/0198233 A1* | 10/2003 | Suda et al. | 370/395.71 |
| 2006/0053270 A1 | 3/2006 | Dunn et al. | |
| 2007/0100933 A1 | 5/2007 | Davies et al. | |
| 2008/0052507 A1 | 2/2008 | Chow et al. | |
| 2008/0162784 A1* | 7/2008 | Obereiner et al. | 711/103 |
| 2009/0228748 A1 | 9/2009 | Hagerott et al. | |
| 2009/0271412 A1 | 10/2009 | Lacapra et al. | |
| 2011/0138116 A1* | 6/2011 | Lipinski et al. | 711/103 |
| 2013/0013655 A1 | 1/2013 | Lacapra et al. | |
| 2013/0013675 A1 | 1/2013 | Lacapra et al. | |
| 2014/0101426 A1* | 4/2014 | Senthurpandi | 713/2 |

OTHER PUBLICATIONS

Notification of Transmittal of The International Search Report and the Written Opinion of the International Searching Authority dated Sep. 29, 2014 for related PCT Application No. PCT/US2014/039232, 19 pages.

\* cited by examiner

*Primary Examiner* — Hyun Nam

(57) ABSTRACT

A data storage device may comprise data storage comprising a first logical unit configured to store user data and a second logical unit configured to store an operating system. A first interface may be configured to couple to a host and a second interface may be configured to couple to a network. In a first mode, the data storage device may be configured to expose the first logical unit to the host and render the second logical unit inaccessible and, in a second mode, the data storage device may be configured to allow access to both the first and the second logical units. The first mode may comprise a direct attached storage (DAS) mode and the second mode may comprise a network attached storage (NAS) mode.

28 Claims, 3 Drawing Sheets

METHODS AND DEVICES FOR BOOTING A NETWORK ATTACHED STORAGE WITH TWO LOGICAL UNITS

CROSS REFERENCE TO RELATED APPLICATIONS

This application claims priority to and the benefit of U.S. Provisional Application No. 61/826,919, filed on May 23, 2013, which is hereby incorporated by reference in its entirety.

BACKGROUND

Typically, external disk drive products are either configured as Direct Attached Storage (DAS) or Network Attached Storage (NAS) drives. DAS drives can only be used with one computer at a time and are connected using a Universal Serial Bus (USB), Thunderbolt, 1394, eSATA, or other type of cable. NAS drives have an Ethernet or wireless LAN (Wi-Fi) interface and can be accessed by multiple computers simultaneously.

DAS devices are generally simpler in design than NAS drives, in that DAS drives need only allow the host (e.g., a PC) to read/write data sectors on its hard disk drive (HDD); they do not parse the file system that the host creates and do not manage the user's files. Because DAS drives operate at the sector level, hosts can create any number of partitions and file systems on the drive. A NAS drive, in contrast, is essentially a small server: it can run a mainstream operating system (OS) such as a customized version of Linux or Microsoft Windows, for example, and provides file sharing services and other features. NAS devices manage their HDDs the same way a full-featured personal computer (PC) or server does, as they partitions their drive(s) according to their requirements and do not allow the user to create arbitrary partitions.

DETAILED DESCRIPTION

Definitions

Figure 1:
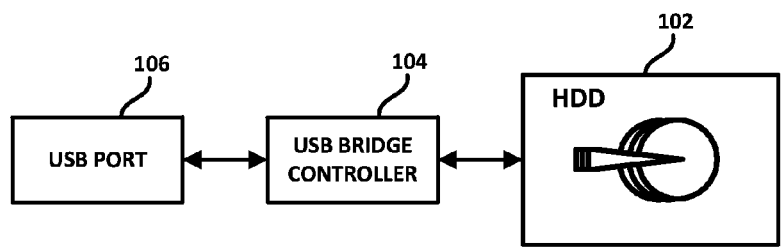
FIG. 1 is a block diagram of a USB device.

DAS: Direct Attached Storage; e.g., an external, bus-connected (e.g., via Universal Serial Bus (USB), Thunderbolt or the like) storage system. DAS refers to a digital storage system directly attached to a server or workstation, without an intervening storage network. The acronym DAS is mainly used to differentiate non-networked storage from Storage Area Network (SAN) and NAS. A DAS may comprise a data storage device (for example enclosures holding a number of hard disk drives) connected directly to a computer through a host bus adapter (HBA), without a network device (such as a hub, switch, or router) therebetween. The main protocols used for DAS connections are ATA, SATA, eSATA, SCSI, SAS and USB, Firewire (IEEE 1394).

NAS: Network Attached Storage; e.g., an external network-connected (e.g., via Ethernet, Wi-Fi interface or the like) storage system. A NAS not only operates as a file server, but is specialized for this task either by its hardware, software, or combinations thereof. NAS devices usually do not have a keyboard or display, and are controlled and configured over the network, often using a browser.

LBA: Logical Block Address. The location of a data sector on a hard disk drive.

Logical Unit: An endpoint within a device that processes commands sent by the host (e.g., a PC.) A device may have multiple logical units with different characteristics and features; e.g., a disk drive and a CD-ROM.

NAS

NAS devices are gaining in popularity as a convenient method of sharing files among multiple computers. Potential benefits of NAS devices, as compared to file servers, include faster data access, easier administration, and simple configuration. NAS systems are networked appliances which may comprise one or more data storage devices (e.g., HDDs, SSDs, hybrid drives, or the like), sometimes arranged into logical, redundant storage containers or a Redundant Array of Inexpensive Disks (RAID). NAS can remove the responsibility of file serving from other servers on the network. NAS devices may provide access to files using network file sharing protocols such as NFS, Server Message Block/Common Internet File System (SMB/CIFS), or AFP.

A full-featured OS is not needed on a NAS device, which may comprise a stripped-down OS. For example, FreeNAS, an open source NAS solution designed for commodity PC hardware, may be implemented as a stripped-down version of FreeBSD. NAS systems may comprise one or more data storage devices, which may be arranged into logical, redundant storage containers or RAID. NAS may use file-based protocols such as NFS (popular on UNIX systems), SMB/CIF (used with MS Windows systems), AFP (used with Apple Macintosh computers), or NCP (used with OES and Novell NetWare). NAS devices need not limit clients to a single protocol.

NAS vs. DAS

A DAS device may be coupled to a server, laptop, desktop or the like and may not necessarily be networked. For example, the DAS device may serve as supplementary storage for a stand-alone computer or may serve as supplementary storage for a networked file server. In contrast, NAS devices are designed as an easy and self-contained solution for sharing files over a network. Both DAS and NAS may be configured to increase availability of data by using RAID or clustering. When both are present on a network, a NAS device may exhibit somewhat better performance than a DAS device, as the NAS device can be tuned precisely for file serving, which is less likely to happen on a server (to which the DAS is coupled) or general purpose computer that is responsible for other processing. Both NAS and DAS device may comprise cache memory, which may positively affect performance. When comparing use of NAS with use of local (non-networked) DAS, the performance of NAS may depend primarily on the speed of and congestion on the network.

NAS devices are generally not as customizable in terms of hardware (CPU, memory, storage components) or software (extensions, plug-ins, additional protocols) as a general-purpose server supplied with DAS. A typical DAS drive, such as an external USB disk drive, allows the user to freely partition the drive. The host to which the drive is coupled assumes complete control of the drive's partitions and file systems.

Conversely, a typical NAS drive is the sole manager of its drive partitions. NAS drives may comprise one or more partitions to store the NAS operating system and one large partition for the user's data. NAS drives allow networked hosts to read/write files in the user's data partition but do not allow the user to re-partition the disk.

One embodiment selectively configures a disk drive to operate in a first mode as a DAS device or in a second mode as a NAS device. According to one embodiment, the disk drive may be configured to comprise at least two logical units, at least one of which may be configured to store the NAS operating system and optionally other NAS related software, with the remaining one or ones being configured to store user data. When the drive is configured to operate in a first mode (e.g., DAS mode), only the logical unit or units configured to store user data may be exposed to the host. In the second mode (e.g., NAS mode), the one or more logical units storing the NAS OS may be exposed to NAS system controller, as may be the logical unit or units configured to store user data. The NAS system controller may then boot from the logical unit(s) storing the NAS OS (or from some other location storing the NAS OS), thereby enabling the drive to configure itself as a NAS and to provide NAS functionality.

Figure 2:
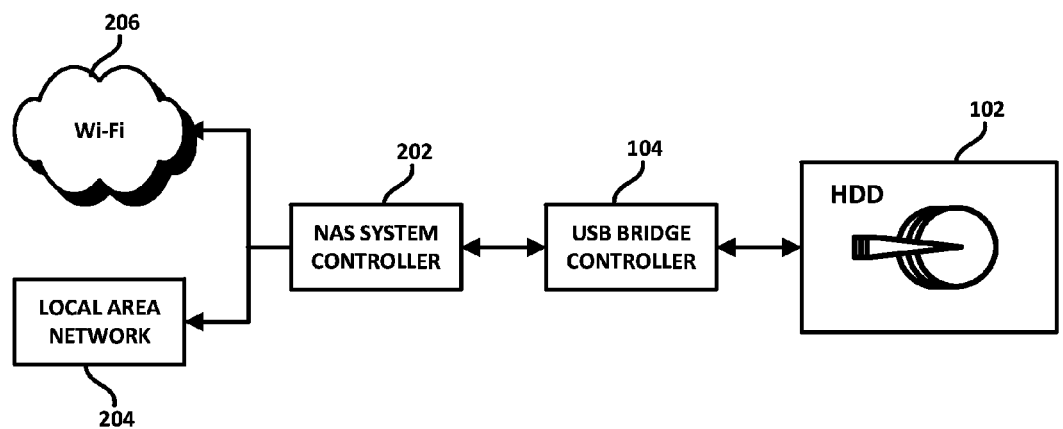
FIG. 2 is a block diagram of a NAS device.

FIG. 1 is a block diagram of a USB storage device. As shown therein, a HDD 102 is coupled to a USB bridge controller 104 and communicates via a UBS port 106. FIG. 2 is a block diagram of a NAS device. As shown therein, HDD 102 is coupled to USB bridge controller 104, which is coupled to a NAS system controller 202, which may interface with a Local Area Network (LAN) 204 and a wireless connection (e.g., Wi-Fi) 206.

According to one embodiment, a combination of a DAS and NAS device may be configured to enable a host computer to create any partition (as is the case with DAS drives) while also managing the file systems, to enable it operate as a file server (as do NAS drives). Accordingly, one embodiment enables the NAS operating system to manage the partitions per its requirements, while also allowing the user to freely partition the drive. Such may be accomplished, according to one embodiment, by a drive that is alternately usable as both DAS and NAS. According to one embodiment, when such a drive is coupled to a host (e.g., plugged into a PC using a USB cable), the drive may be configured to operate in a first, e.g., DAS mode. Conversely, when such a drive is coupled to a cabled Ethernet connection or accesses a wireless LAN (e.g., Wi-Fi), then the drive may be configured to operate in a second, e.g., NAS mode. When so configured as a NAS device, the disk drive may be configured to store the user's data as well as the NAS operating system (e.g., Linux), software, and the like. According to one embodiment, that portion (e.g., range of LBAs or partition) of the drive storing the NAS OS and its various drivers and other software may be configured so as to not be exposed to the host or user as storage that is accessible, lest the host or user make changes thereto that could break or impair the NAS functionality of the drive.

Figure 3:
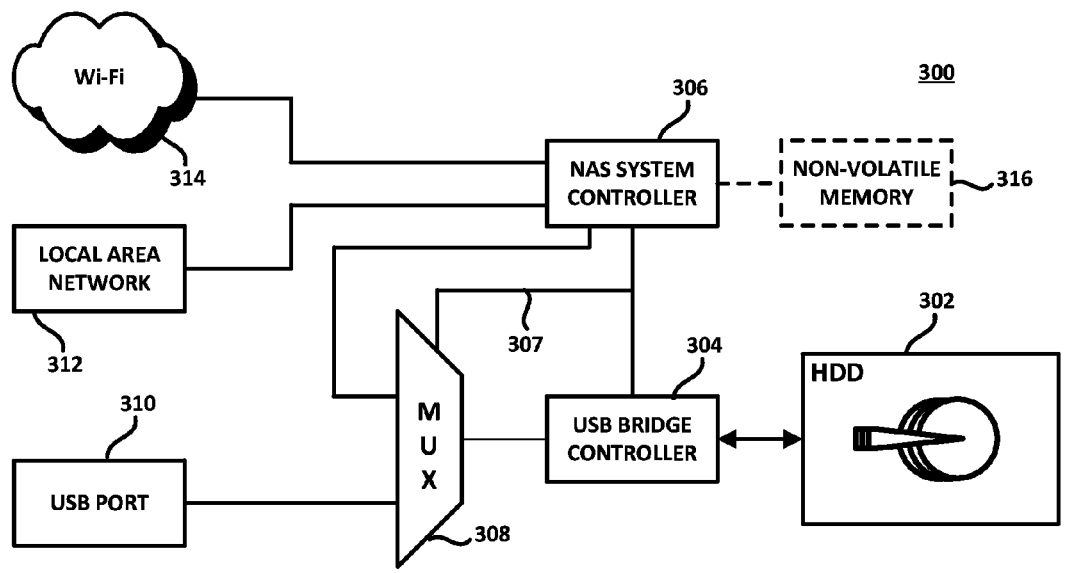
FIG. 3 is a block diagram of a device selectively configurable as a DAS device or as a NAS device, according to one embodiment.

FIG. 3 is a block diagram of a device 300 that is selectively configurable as a DAS device or as a NAS device, according to one embodiment. As shown therein, a HDD 302 (which may comprise rotating and/or fixed storage media) may be coupled to a bridge controller 304, via a, for example, ATA, SATA, eSATA, SCSI or SAS connection. The bridge controller 304 may be configured to communicate with a port 310 that may be configured according to, for example, the USB protocol. According to one embodiment, the HDD 302 may be solely coupled to the bridge controller 304. The bridge controller 304 may comprise, for example, an 8-bit or 32-bit microcontroller. A NAS system controller 306 may be coupled to the bridge controller 304 and may access the HDD 302 through the bridge controller 304. The NAS system controller 306 may comprise, for example, a System on Controller (SoC) comprising an, e.g., 32-bit microprocessor, together with other ancillary systems, such as dynamic random access memory (DRAM), a memory manager and/or other peripheral controllers. A multiplexor (mux) 308 may be configured to couple the bridge controller 304 to either the NAS system controller (SoC) 306 or a first interface, such as interface port 310 configured according to a first communication protocol such as, for example, USB. The NAS SoC 306 and the bridge controller 304 may be configured to coordinate the control of the mux 308 as shown at 307 and determine whether the device is to be configured and operate as a DAS or as a NAS. Other control circuitry may, according to one embodiment, be interposed between the bridge controller 304 and the NAS system controller 306 for the purpose of, for example, generating the control signal 307 to the mux 308. The NAS system controller 306 and the bridge controller 304, according to one embodiment, may be included in a single integrated circuit or assembly.

According to one embodiment, when a connection to the drive's USB interface port(s) 310 is detected, such as when interface port 310 is coupled to a host (e.g., plugged into a PC) and processing data access commands for the host, the mux 308 may be controlled such that the device 300 is configured in a first mode in which the bridge controller 304 is connected to the USB port 310. In this configuration, the NAS controller 306 may be inactive or at least decoupled from the data path. According to one embodiment, when a connection to the drive's USB interface port(s) 310 is not detected, such as when the USB interface port 310 is not plugged in to a host or is being used solely to charge the HDD's internal rechargeable batteries, then the mux 308 may be controlled, according to one embodiment, so that the device is configured in a second mode in which the NAS system controller 306 accesses and boots from the HDD 302. In this configuration, the HDD 302 may be configured to store and serve up files in NAS mode, as requested from devices coupled to the LAN 312 and/or to the Wi-Fi 314. Alternatively, according to one embodiment, a non-volatile memory 316 may be coupled to the NAS system controller 306. Such a non-volatile memory 316 may be configured to store the NAS OS. In this case, when the USB interface port 310 is not plugged in to a host or is being used solely to charge the HDD's internal rechargeable batteries, the NAS system controller 306 may access the non-volatile memory 316 and boot its OS from the copy thereof stored in the non-volatile memory 316. In this configuration, the NAS system controller 306 may boot its OS from the non-volatile memory 316 at power-up and may remain booted (and thus immediately available for file serving duties) at all times. According to one embodiment, the HDD 302 may comprise a plurality of disk drives, which may be in a RAID configuration.

Figure 4:
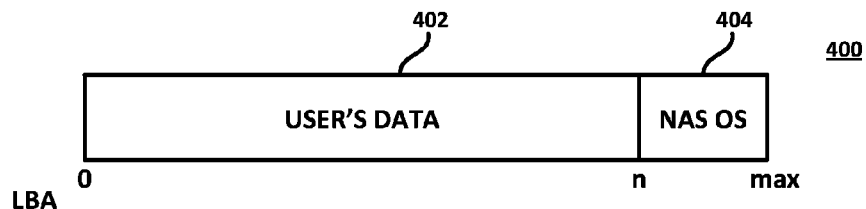
FIG. 4 is a block diagram of a memory storage comprising two logical units, according to one embodiment.

One embodiment addresses the manner in which the user's data and NAS operating system is organized on the mass storage device, in the case in which the NAS OS is stored on the HDD 302. According to one embodiment, the HDD may be logically divided into two areas; namely, a first (e.g., large) portion for the user's data files, and a second (e.g., smaller) area for the NAS operating system and software, as shown in FIG. 4. As shown therein, reference numeral 400 represents the usable storage space on a mass storage device such as a HDD. According to one embodiment, the user area 402, configured to store the user's data, may span from LBA 0 to LBA n and may represent a first logical unit. The portion of the mass storage device reserved for the NAS' OS and other NAS-related software may span, for example, from LBA n+1 to LBA max, where max corresponds to the highest numbered available LBA, and the span from LBA n+1 to LBA max may represents a second logical unit. According to one embodiment, when the drive is operating in DAS mode, the bridge controller 304 may expose only the first logical unit 402 to the host and use, from LBA to LBA n. The second logical unit, from LBA n+1 to LBA max, is not exposed to the host or user when the drive is operating in DAS mode and is thus effectively hidden while the HDD is configured in DAS mode. According to a one embodiment, the two portions of the HDD 302 need not be configured as physically distinct logical units, but may use overlapping "virtual" logical units. For example, in DAS mode, the HDD may be configured to report that its size spans from LBA 0 to LBA n, i.e., not reporting to the host even the existence of the LBAs ranging from LBA n+1 to LBA max. In NAS mode, the HDD may be configured to report that its size spans from LBA0 to LBA max, thereby enabling the NAS system controller 306 access to the entire range of LBAs, including that portion thereof spanning from LBA n+1 to LBA max, from which the NAS system controller 306 may boot its OS, if the NAS OS is indeed stored within that LBA range.

In the case in which HDD 302 is configured with two logical units, when the drive is configured to operate in NAS mode; that is, when the mux 308 couples the bridge controller 304 to the NAS system controller 306, the USB bridge may expose both the first logical unit 402 and the second logical unit 404. This enables the NAS system controller 306 to, according to one embodiment, boot up from the NAS OS stored on the second logical unit 404 on the HDD 302 and to carry out NAS-specific functionality. Indeed, exposing the first logical unit enables access to the user-data area, i.e., LBA 0 to n. Exposing the second logical unit enables access to the NAS operating system area, i.e., LBA n+1 to LBA max. The NAS system controller 306 may be configured, according to one embodiment, to boot from the second logical unit 404 and to allow networked hosts (not shown) to access the user's data on the first logical unit 402, from either the LAN 312 (e.g., an Ethernet connection) or through Wi-Fi 314.

Since, according to one embodiment, the HDD's capacity may be presented as two different logical units by the bridge controller 304, each logical unit, according to one embodiment, may be partitioned independently. Indeed, the disk's first logical unit 402 may be freely partitioned when the HDD is coupled to a host such as a PC in DAS mode, and the second logical unit 404 storing the NAS OS may be partitioned as needed for and by the NAS system controller 306.

The NAS system controller 306, according to one embodiment, may be configured to boot from the second logical unit 404, which may store the NAS OS files. Once the NAS operating system is loaded, it may operate in the same or a similar manner as the OS in any other NAS device, in that it may be configured to mount the file system(s) on the first logical unit 402 and to allow access to the mounted file system by networked hosts.

Figure 5:
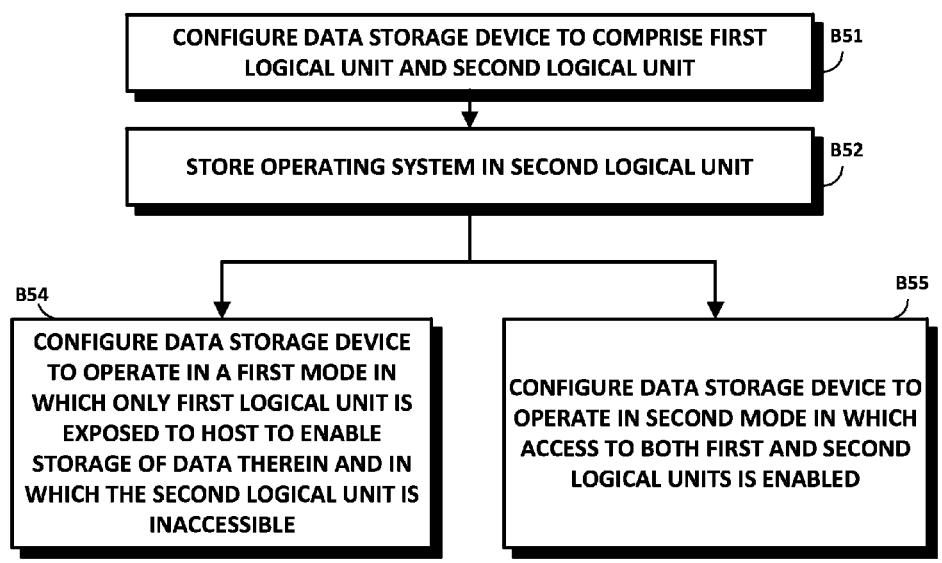
FIG. 5 is a flowchart of a method of operating a data storage device that comprises a first interface configured to couple to a host and a second interface configured to couple to a network, according to one embodiment.

FIG. 5 is a flowchart of a method of operating a data storage device that comprises a first interface configured to couple to a host and a second interface configured to couple to a network, according to one embodiment. As shown therein, Block B51 calls for configuring a data storage device to comprise a first logical unit and a second logical unit, and Block B52 calls for storing a (e.g., NAS) operating system in the second logical unit of the data storage device. Thereafter, the data storage device may be configured in a first mode as shown at Block B54 or in a second mode, as shown at B55. Block B54, as shown in FIG. 5, calls for configuring the data storage device in the first mode, in which only the first logical unit is exposed to the host, to enable storage of data therein. As also shown in B54, the first mode configures the data storage device such that the second logical unit is not exposed to the host and is, therefore, inaccessible to the host. As shown at B55, the data storage device, in the second mode, may be configured to enable access to both the first and the second logical units.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data storage device, comprising:
   data storage comprising a first logical unit configured to store user data and a second logical unit configured to store an operating system;
   a first interface configured to couple to a host; and
   a second interface configured to couple to a network,
   a second controller coupled to the second interface; and
   a first controller selectively configured to be coupled to one of the first interface and the second controller;
   wherein, in a first mode, the data. storage device is configured to render the first logical unit accessible to the host and render the second logical unit inaccessible to the host and, in a second mode, o render both the first logical unit and the second logical unit accessible to the host, and
   wherein the second controller is only active when the data storage device operates in the second mode.

2. The data storage device of claim 1, wherein the first mode is enabled when a connection to the first interface is detected.

3. The data storage device of claim 1, wherein the second mode is enabled when a connection to the first interface is not detected.

4. The data storage device of claim 1, wherein the data storage comprises a plurality of disks.

5. The data storage of claim 4, wherein the plurality of disks are in a Redundant Array of inexpensive Disks (RAID) configuration.

6. The data storage device of claim 1, wherein the second mode is enabled when a connection to the first interface is detected.

7. The data storage device of claim 1, wherein the first mode comprises a direct attached storage (DAS) mode.

8. The data storage device of claim 1, wherein the second mode comprises a network attached storage (NAS) mode.

9. The data storage device of claim 1 wherein, in the second mode, the data storage device is further configured to boot the operating system stored in the second logical unit.

10. The data storage device of claim 1, wherein the first logical unit spans a first predetermined range of logical block addresses (LBAs) and wherein the second logical unit spans a second predetermined range of LBAs that does not overlap with the first predetermined range of LBAs.

11. The data storage device of claim 1, wherein the second interface is configured to selectively couple to a wired network connection and to a wireless network connection.

12. A method of operating a data storage device that comprises a first controller, a first interface configured to couple to a host, a second interface configured to couple to a network, and a second controller coupled to the second interface, the method comprising:
configuring data storage of the data storage device to comprise a first logical unit and a second logical unit;
storing an operating system in the second logical unit; and
configuring the data storage device to operate in one of a first mode and a second mode such that, in the first mode, the controller is coupled to the first interface and only the first logical unit is accessible to the host to enable storage of user data therein and the second logical unit is inaccessible to the host and such that in the second mode, the first controller is coupled to the second controller and both the first logical unit and the second logical unit are accessible to the host,
wherein the second controller is configured to process data access commands only in the second mode.

13. The method of claim 12, further comprising detecting a connection on the first interface and configuring the data storage device to operate in the first mode when the connection is detected on the first interface and configuring the data storage device to operate in the second mode when the connection is not detected on the first interface.

14. The method of claim 13, further comprising booting the operating system stored in the second logical unit when the connection is not detected on the first interface.

15. The method of claim 12, further comprising detecting a connection on the first interface and configuring the data storage device to operate in the second mode when the connection is detected on the first interface.

16. The method of claim 12, wherein the first mode comprises a direct attached storage (DAS) mode.

17. The method of claim 12, wherein the second mode comprises a network attached storage (NAS) mode.

18. The method of claim 12, data storage device of claim 1, wherein the data storage comprises a plurality of disks.

19. The method of claim 18, wherein the plurality of disks are in a Redundant Amy of inexpensive Disks (RAID) configuration.

20. The method of claim 12, wherein configuring comprises defining the first logical unit to span a first predetermined range of logical block addresses (LBAs) and defining the second logical unit to span a second predetermined range of LBAs that does not overlap with the first predetermined range of LBAs, 21. The method of claim 12, wherein the data storage device comprises a first controller and a second controller and wherein the method further comprises configuring the second controller to process data access commands only when the data storage device operates in the second mode.

22. The method of claim 12, wherein the second interface is configured to selectively couple to a wired network connection and to a wireless network connection.

23. A data storage device, comprising:
data storage comprising a first logical unit configured to store user data and a second logical unit configured to store an operating system;
a first interface configured to couple to a host; and
a second interface configured to couple to a network,
a second controller coupled to the second interface;
a first controller selectively configured to be coupled to one of the first interface and the second controller: and
a multiplexer coupled to the first interface and to the second controller, wherein the multiplexer is configured to couple the first interface to the first controller when the data storage device operates in a first mode in which the data storage device is configured to render the first logical unit accessible to the host and render the second logical unit inaccessible to the host and wherein the multiplexer is further configured to couple the second controller to the first controller When the data storage device operates in a second mode in which the data storage device is configured to render both the first and the second logical units accessible to the host.

24. The data storage device of claim 23, wherein the first mode comprises a direct attached storage (DAS) mode.

25. The data storage device of claim 23, wherein the second mode comprises a network attached storage (NAS) mode.

26. A method of operating a data storage device that comprises a first controller, a first interface configured to couple to a host, a second controller and a second interface configured to couple to a network, the method comprising:
configuring data storage of the data storage device to comprise a first logical unit and a second logical unit; and
storing an operating system in the second logical unit; and
selectively
coupling the first interface to the first controller to cause the data storage device to operate in a first mode in which only the first logical unit is rendered accessible to the host to enable storage of user data therein and the second logical unit is rendered inaccessible to the host,
or
coupling the second controller to the first controller to cause the data storage device to operate in a second mode in which the both the first and the second logical units accessible to the host,
wherein the second controller is configured to process data access commands only when the data storage device operates in the second mode.

27. The method of claim 26, wherein the first mode comprises a direct attached storage (DAS) mode.

28. The method of claim 26, wherein the second mode comprises a network attached storage (NAS) mode.

* * * * *